(12) United States Patent
Morand

(10) Patent No.: US 6,312,764 B1
(45) Date of Patent: Nov. 6, 2001

(54) PROCESS LIMITING OVEROXIDATION OF COILED, HOT-ROLLED SHEET STRIP

(75) Inventor: Claude Morand, Miramas (FR)

(73) Assignee: Sollac, Puteaux (FR)

( * ) Notice: Subject to any disclaimer, the term of this patent is extended or adjusted under 35 U.S.C. 154(b) by 0 days.

(21) Appl. No.: 09/362,701

(22) Filed: Jul. 29, 1999

(30) Foreign Application Priority Data

Jul. 30, 1998 (FR) .................................................. 98 09741

(51) Int. Cl.$^7$ ................................. B05D 1/04; B05D 5/00
(52) U.S. Cl. ......................... 427/467; 427/469; 427/193; 427/199; 427/284
(58) Field of Search ..................................... 427/467, 469, 427/482, 486, 204, 284, 156, 193, 199, 287; 501/21, 77; 148/537

(56) References Cited

U.S. PATENT DOCUMENTS

| | | | |
|---|---|---|---|
| 2,786,782 | * | 3/1957 | Zimmerman et al. . |
| 3,671,278 | | 6/1972 | Borowski . |
| 3,759,240 | | 9/1973 | Borowski . |
| 3,765,205 | * | 10/1973 | Schaumburg . |
| 3,836,380 | * | 9/1974 | Kramer . |
| 3,930,062 | * | 12/1975 | Nedeljkovic . |
| 4,221,824 | * | 9/1980 | Leonard et al. . |
| 4,469,798 | * | 9/1984 | Nishino et al. . |
| 5,512,521 | | 4/1996 | Fu et al. . |

FOREIGN PATENT DOCUMENTS

| | | |
|---|---|---|
| 0 736 334 | 10/1996 | (EP) . |
| 2 083 650 | 12/1971 | (FR) . |
| 2 140 709 * | 12/1984 | (GB) . |

* cited by examiner

Primary Examiner—Fred J. Parker
(74) Attorney, Agent, or Firm—Oblon, Spivak, McClelland, Maier & Neustadt, P.C.

(57) ABSTRACT

Treatment process limiting the overoxidation of the sides of a coiled, hot-rolled sheet strip delivered from a strip mill, characterized in that a vitrifiable powder is sprayed onto the lateral portions of the coil, called edges, fusing at the time of its contact with the steel coil delivered from hot-rolling, the sheet strip undergoing cooling at a temperature below the coiling temperature, the cooling of the strip ensuring the solidification of an impervious enamel on the surface of the coil edges and air-tightness of the space contained between the turns of the coil.

7 Claims, 1 Drawing Sheet

PROCESS LIMITING OVEROXIDATION OF COILED, HOT-ROLLED SHEET STRIP

BACKGROUND OF THE INVENTION

1. Field of the Invention:

The invention relates to a treatment process limiting the overoxidation of steel, such as for example the sides of a coiled, hot-rolled sheet strip delivered from a strip mill.

2. Discussion of the Background

In iron-and-steel plants, cooling, prior to pickling, of strips of steel sheet prepared in the form of coils, requires substantial stocking areas. Cooling time in ambient air for a single coil is on the order of 70 hours. This time may be even longer in the event that the coils are superposed. In some plants, the coils are immersed in pools to accelerate their cooling. The advantages of this technique are to reduce the stocking area, the stocking time in particular between the strip mill and pickling, and the duration of pickling, the thickness of the scale forming on the steel strips being, less at the sides.

The scale formed at the time of hot rolling in the strip mill, between 800° C. and 700° C., consists of 3 oxides which each have their own rate of growth.

Hematite, $Fe_2O_3$, in contact with the atmosphere, is the most oxidized compound. For a scale of 10 $\mu$m in thickness, formed at 700° C., the thickness of the hematite film is on the order of 0.01 $\mu$m.

FeO, in contact with the steel, is the least oxidized compound. For a scale of 10 $\mu$m in thickness, the thickness of the FeO film formed is on the order of 7.26 $\mu$m.

Between these two oxides, there is formed a compound of the spinel type, formed by the two preceding oxides. The thickness of this spinel, for a scale thickness of 10 $\mu$m, is about 0.63 $\mu$m.

The thickness of the scale formed on the hot-rolled steels depends on the dwell time on the cooling table, therefore on the coiling speed, on the rolling temperature and on the coiling temperature.

In the course of cooling in coil, at the sides, the oxygen present between the consecutive turns allows the continuation of oxidation, while this is checked rapidly at the center of the coil.

The center of the coil cools very slowly. The cooling speed is a function, in particular, of the mass of said coil. The decomposition of FeO sheltered from the air is practically complete; it is transformed into $Fe_3O_4$+Fe eutectoid.

The sides undergo an overoxidation according to the coiling temperature and the coil mass. This overoxidation occurs through the formation of a film of hematite the removal time for which determines the duration of pickling.

As the speed of cooling of the sides is more rapid, the decomposition of FeO into eutectoid is not complete, and the presence of magnetite is observed.

To promote adherence of the scale at the sides, it is necessary to avoid overoxidation and to approach the structure of the oxide forming the scale at the center of the coiled strip.

Cooling in a pool makes it possible to obtain this result but with the drawback on the one hand, of being burdensome and, on the other, of altering the mechanical characteristics of the steel which constitutes the strips.

OBJECT OF THE INVENTION

One object of the invention is to avoid the formation of a film of hematite on the sides of a hot-rolled steel sheet strip, without altering the mechanical characteristics of the steel, which is a risk in the technique of cooling in a pool. Other objects apply this technology to steel in general.

DETAILED DESCRIPTION OF THE INVENTION

The preferred embodiment of the invention is a treatment process limiting the overoxidation of the sides of coiled, hot-rolled sheet strips including those delivered from a strip mill, characterized in that a powder which becomes solidified and ensures the air-tightness of the space contained between the turns of the coil, is sprayed onto the lateral portions of the coil, called edges.

Other characteristics of the invention are:

a vitrifiable powder is sprayed onto the coil edges, fusing at the time of its contact with the steel coil delivered from hot rolling, the sheet strip undergoing cooling at a temperature below the coiling temperature, the cooling of the strip ensuring the solidification of an impervious enamel on the surface of the coil edges, the vitrifiable powder is mixed with a compound endowing said compound with an electrostatic behavior and preventing adsorption of water, the vitrifiable powder forming the enamel is a glass the composition (percentages by weight) comprising, consisting essentially of, or consisting of the following:

10%<$Fe_2O_3$<50%
10%<$Na_2B_4O_7$<80%
0%<$P_2O_5$<10%
5%<$SiO_2$<50%
0%<$TiO_2$<15%
5%<$Na_2CO_3$<20%
5%<$K_2CO_3$<20%
0%<$CaCO_3$<10%, the vitrifiable powder forming the enamel preferably is a glass the composition of which comprises, consists of, or consists essentially of:

| | |
|---|---|
| $Fe_2O_3$ | 30% |
| $Na_2B_4O_7$ | 15% |
| $P_2O_5$ | 3% |
| $SiO_2$ | 15% |
| $TiO_2$ | 9% |
| $Na_2CO_3$ | 11% |
| $K_2CO_3$ | 15% |
| $CaCO_3$ | 2%. |

The invention also includes a glass in the form of a powder and its use to ensure the air-tightness of the space contained between the turns of a coil of a hot-rolled steel sheet delivered from a strip mill, a powder which fuses at a temperature below the coiling temperature and becomes solidified on cooling of the coil, to ensure air-tightness of the space contained between the turns of said coil.

Other characteristics of the invention include:

the powder is vitrifiable, fusing at the time of its contact with the steel coil delivered from hot rolling, the cooling of the strip ensuring the solidification of a continuous impervious enamel on the surface of the coil edges, it has the composition of a glass comprising, consisting of, or consisting essentially of:

10%<$Fe_2O_3$<50%
10%<$Na_2B_4O_7$<80%
0%<$P_2O_5$<10%

$5\% < SiO_2 < 50\%$
$0\% < TiO_2 < 15\%$
$5\% < Na_2CO_3 < 20\%$
$5\% < K_2CO_3 < 20\%$
$0\% < CaCO_3 < 10\%$, it preferably has the composition of a glass comprising, consisting of, or consisting essentially of:

| | |
|---|---|
| $Fe_2O_3$ | 30% |
| $Na_2B_4O_7$ | 15% |
| $P_2O_5$ | 3% |
| $SiO_2$ | 15% |
| $TiO_2$ | 9% |
| $Na_2CO_3$ | 11% |
| $K_2CO_3$ | 15% |
| $CaCO_3$ | 2% | the powder is mixed with a compound endowing said powder with an electrostatic behavior and preventing adsorption of water.

The following description and the sole FIGURE presented, all given by way of non-limitative example, will make the invention clearly understood.

BRIEF DESCRIPTION OF THE DRAWING

The FIGURE shows the appearance of a portion of a coil edge after enameling and cooling.

The invention relates to a treatment process limiting the overoxidation of the sides of coiled, hot-rolled sheet strips delivered from a strip mill. According to the process, a powder which becomes solidified to ensure the air-tightness of the space contained between the turns of the coil is sprayed onto the lateral portions of the coil, called edges.

Figure 1:
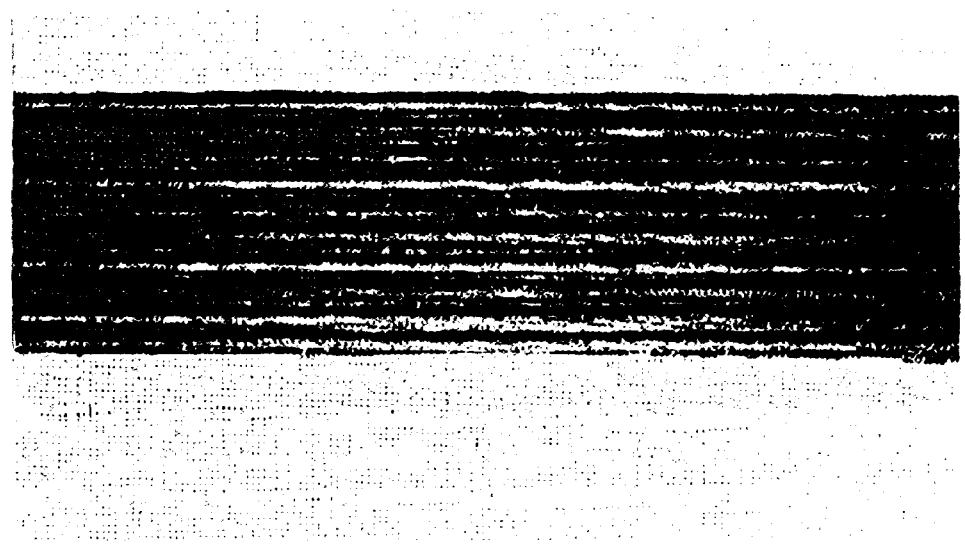

A vitrifiable powder is sprayed onto the coil edges, fusing at the time of its contact with the steel coil delivered from hot rolling, the sheet strip undergoing cooling at a temperature below the coiling temperature, the cooling of the strip ensuring the solidification of a continuous impervious enamel on the surface of the coil edges. The enamel formed prevents intake of air between the turns of the coils.

In an example of application according to the invention, the enamel has a fusing temperature ranging between 600° C. and 630° C. In fact, although the hot-rolling temperature is about 700° C., the treatment may be performed, for example, in the first tipper, the coil temperature being above 630° C., or about 45 min. after coiling. The time lag between the coiling and the spraying of the glass powder is connected with reasons of industrial practices.

The vitrifiable powder, prior to spraying onto the edge of the coil by means of an electrostatic gun, is mixed with a compound endowing said powder with an electrostatic behavior, which is within the skill of the ordinary artisan. The compound also may be water-resistant.

The enamel has the property of coming off cleanly at the time of unwinding of the coils and accordingly does not clog the rollers.

The glass used in the process according to the invention has the following composition:
$10\% < Fe_2O_3 < 50\%$
$10\% < Na_3B_4O_7 < 80\%$
$0\% < P_2O_5 < 10\%$
$5\% < SiO_2 < 50\%$
$0\% < TiO_2 < 15\%$
$0\% < Na_2CO_3 < 20\%$
$5\% < K_2CO_3 < 20\%$
$0\% < CaCO_3 < 10\%$ The composition can comprise, consist of, or consist essentially of the above compounds should satisfy the conditions for vitrification.

The network formers generally have a small ionic radius and coordination numbers of 3 or 4. The silicon ion has an ionic radius of 0.039 nm and a coordination number of 4. It thus satisfies the condition of former. The $Fe^{3+}$ cations having an ionic radius of 0.067 nm theoretically cannot form a network.

The radius of the $Al^{3+}$ ion is 0.057 nm and this ion is situated at the boundary between the coordination numbers 4 and 6. Accordingly, when alumina is introduced into the composition of a glass, the scarcely polarizable $O^{2+}$ ions force the Al ions to coordination number 6, which cannot be suitable for the formation of a network. Nonetheless, glasses may be obtained in a silica-plus-alumina structure. As a matter of fact, by introducing alumina into the composition of a soda-lime glass, the Al ion is afforded the possibility of coordinating to form $AlO_4$ groupings starting from more easily polarizable non-bridging oxygens, thus becoming a network former.

Now it has been observed that the iron oxide $Fe_2O_3$ is an oxide of the same type as $Al_2O_3$. The ionic radius of $Fe^{3+}$ is 0.067 nm. Like the Al ion, this ion is situated at the boundary between coordination number 4 and 6 and may replace $Al_2O_3$ in the basic composition for soda-lime glass.

Accordingly, as in the case of alumina, the introduction of $Fe_2O_3$ into a soda-lime glass has been suggested so as to afford the $Fe^{3+}$ ion the possibility of coordinating to form $FeO_4$ groupings starting from non-bridging oxygens and becoming, in part, a network former.

$P_2O_5$ also is an oxide currently used as a network former.

In the manufacture of glasses, the well known role of alkaline oxides, such as $Na_2O$ and $K_2O$ is to weaken the structure, and accordingly they are network modifiers. The same is true for the alkaline-earth oxides, among which CaO is the most widely used.

The modifiers have the quality of lowering glass fusion temperature.

The enamel according to the invention must fuse starting at 630° C., a temperature lower than the fusion temperature of the iron oxide $Fe_2O_3$.

In a preferred composition according to the invention of the type comprising, consisting of, or consisting essentially of:

| | |
|---|---|
| $Fe_2O_3$ | 30% |
| $Na_2B_4O_7$ | 15% |
| $P_2O_5$ | 3% |
| $SiO_2$ | 15% |
| $TiO_2$ | 9% |
| $Na_2CO_3$ | 11% |
| $K_2CO_3$ | 15% |
| $CaCO_3$ | 2% | which enamel retains its vitreous structure with 30% iron and 15% silica. This enamel fuses at a temperature below 630° C.

The glass frit obtained by fusion and pouring next is dried, then ground.

To make the powder for this glass electrostatic and to facilitate its spraying by means of an electrostatic gun, a product of the diphenylsilanediol type is introduced during grinding of the frit at a ratio of 3.5% by mass. The purpose is to increase resistivity and to prevent adsorption of water.

Now it has been observed that the iron oxide $Fe_2O_3$ is an oxide of the same type as $Al_2O_3$. The ionic radius is 0.067 nm. Like the Al ion, this ion is situated at the boundary between coordination number 4 and 6 and may replace $Al_2O_3$ in the basic composition for soda-lime glass.

Without enameling, this thickness of the scale on the sides is approximately 27 μm.

When the two edges of a coil are enameled with a glass containing 15% silica, the layer of scale between the turns has a thickness of 13 μm. This is the normal thickness of the oxide layer, without $Fe_2O_3$. With an enamel containing 12% silica, a scale the thickness of which is 20 μm is formed on the sides. Which proves that the enamel formed is porous and does not prevent the formation of hematite.

With an enamel containing 15 to 20% silica, the thickness of the scale is on the order of 12 to 13 μm, without formation of hematite, there is no overoxidation.

The enamel according to the invention blocks the formation of oxide between the turns of the coil; the pickling time for said coil thus may be reduced by half.

From the point of view of adherence, measurements have been made to characterize the enamel.

The enamel deposited starting from a glass powder containing 12% silica has a good adherence.

The enamel deposited starting from a glass powder containing 15% silica has a poor adherence.

The enamel deposited starting from a glass powder containing 20% silica has an acceptable relative adherence.

It must be taken into consideration that the criterion sought in the process according to the invention is a poor adherence of the enamel, for the elimination of this enamel after cooling of the coil in the course of unwinding at the pickling inlet. With a silica content which is too low, the vitreous nature of the enamel is lost, the layer deposited on the edge is of a crystalline structure, less fragile and more adhesive.

The adherence of the enamel made with a glass containing 20% silica is slightly higher than that of the enamel containing 15% silica. That is due to the fact that the dissolution of iron in the enamel is accompanied by a deposit of silicon on the surface of the steel. The silicon serves as a binder between the steel and the enamel resulting in an increase in adherence.

The enamel according to the invention makes it possible:

- to prevent overoxidation of the sides of the coils in the course of cooling, slow cooling sheltered from air promoting the formation of FeO without formation of hematite and a blister-type phenomenon under heat,
- to reduce the pickling time for steel coils by a factor of approximately 2,
- to prevent clogging of the rollers, the enamel being eliminated because of the weak adherence to the steel,
- to prevent contamination of the pickling bath for the steel strips, the glass composition being iron-oxide based.

French patent application 98 09741 filed Jul. 30, 1998, is incorporated herein by reference.

What is claimed is:

1. A process for limiting the overoxidation of a side of a coiled, hot-rolled sheet strip having spaces between turns of the coil, comprising: providing the coiled, hot-rolled sheet strip delivered from a hot rolling process at a temperature sufficient to cause fusing of a subsequently applied powder contacting the coiled, hot-rolled sheet strip, spraying and contacting powder onto an edge of said coiled, hot-rolled sheet strip to cause fusing of the powder, and then causing solidification of said powder on said edge by cooling of the coiled, hot-rolled sheet strip to form a layer which ensures air-tightness of spaces between the turns of said coiled, hot-rolled sheet strip.

2. The process according to claim 1, wherein said powder is a vitrifiable powder, the powder fusing at the time of its contact with said edge, the coil being delivered from hot rolling, the sheet strip undergoing cooling at a temperature below a coiling temperature, the cooling of the strip providing the solidification of said powder, and thereby an enamel on the coil edge.

3. The process according to claim 2, wherein the vitrifiable powder forming the enamel is a glass comprising the following in percent by weight:

$10\% < Fe_2O_3 < 50\%$
$10\% < Na_2B_4O_7 < 80\%$
$0\% < P_2O_5 < 10\%$
$5\% < SiO_2 < 50\%$
$0\% < TiO_2 < 15\%$
$5\% < Na_2CO_3 < 20\%$
$5\% < K_2CO_3 < 20\%$
$0\% < CaCO_3 < 10\%$.

4. The process according to claim 3, wherein the vitrifiable powder further comprises a compound endowing said powder with an electrostatic behavior and preventing adsorption of water.

5. The process according to claim 3, wherein the vitrifiable powder forming enamel is a glass the composition consisting of in percent by weight:
$Fe_2O_3$ 30%
$Na_2B_4O_7$ 15%

| | |
|---|---|
| $P_2O_5$ | 3% |
| $SiO_2$ | 15% |
| $TiO_2$ | 9% |
| $Na_2CO_3$ | 11% |
| $K_2CO_3$ | 15% |
| $CaCO_3$ | 2%. |

6. The process of claim 1 wherein said sheet strip is steel.

7. The process according to claim 1, wherein said powder has a fusing temperature ranging between 600° C. and 630° C.

* * * * *